United States Patent
Sirkett et al.

(10) Patent No.: US 8,967,365 B2
(45) Date of Patent: Mar. 3, 2015

(54) COMPONENT FEEDER SYSTEM AND METHOD FOR FEEDING AND DISPLAYING COMPONENTS

(71) Applicants: Daniel Sirkett, Vasteras (SE); Ivan Lundberg, Vasteras (SE); Siim Viilup, Vasteras (SE)

(72) Inventors: Daniel Sirkett, Vasteras (SE); Ivan Lundberg, Vasteras (SE); Siim Viilup, Vasteras (SE)

(73) Assignee: ABB Technology Ltd. (CH)

( * ) Notice: Subject to any disclaimer, the term of this patent is extended or adjusted under 35 U.S.C. 154(b) by 0 days.

(21) Appl. No.: 14/326,721

(22) Filed: Jul. 9, 2014

(65) Prior Publication Data
US 2014/0312058 A1    Oct. 23, 2014

Related U.S. Application Data

(63) Continuation of application No. PCT/EP2013/050343, filed on Jan. 10, 2013, and a continuation of application No. PCT/EP2012/051502, filed on Jan. 31, 2012.

(51) Int. Cl.
*B65G 47/24* (2006.01)
*B65G 47/19* (2006.01)

(52) U.S. Cl.
CPC .................................... *B65G 47/19* (2013.01)
USPC ......................................... 198/396; 198/444

(58) Field of Classification Search
CPC .............. B65G 47/19; B65G 47/1407; B65G 47/1414; B65G 47/1492; B65G 47/1442
USPC ......................................... 198/395, 396, 444
See application file for complete search history.

(56) References Cited

U.S. PATENT DOCUMENTS

| | | | | |
|---|---|---|---|---|
| 2,969,136 A | * | 1/1961 | Mumma | 198/444 |
| 3,876,064 A | * | 4/1975 | Morton | 198/381 |
| 4,678,073 A | * | 7/1987 | Anderson et al. | 198/396 |
| 4,917,562 A | * | 4/1990 | Colli et al. | 198/444 |
| 5,062,521 A | | 11/1991 | Hockman | |

(Continued)

FOREIGN PATENT DOCUMENTS

| | | |
|---|---|---|
| DE | 3503102 A1 | 8/1985 |
| DE | 3817465 A1 | 11/1989 |

(Continued)

OTHER PUBLICATIONS

International Preliminary Report on Patentability Application No. PCT/EP2013/050343 Completed: Jan. 16, 2014 9 pages.

(Continued)

*Primary Examiner* — James R Bidwell
(74) *Attorney, Agent, or Firm* — St. Onge Steward Johnston & Reens LLC

(57) ABSTRACT

A component feeder including a bulk storage container for storage of components, and a lift for elevating a selection of components from the container, the lift being located inside the container. The feeder further includes a transfer arrangement for transferring elevated components from the lift onto a component pick surface on which the components are distributed in order to be picked by a tool or by a hand, and a plate configured to include the component pick surface. Further described is a component feeder system including at least one component feeder, a camera for monitoring the component pick surface and a processor used to control an industrial robot to pick pickable components lying on the pick surface. A corresponding method is also described.

14 Claims, 3 Drawing Sheets

(56) References Cited

U.S. PATENT DOCUMENTS

| | | | |
|---|---|---|---|
| 5,680,922 A * | 10/1997 | Bessels | 198/398 |
| 6,257,395 B1 | 7/2001 | Yokajty et al. | |
| 6,789,661 B2 | 9/2004 | Davies et al. | |
| 6,966,453 B2 * | 11/2005 | Tian | 221/200 |
| 8,276,742 B1 * | 10/2012 | Veno et al. | 198/396 |
| 2003/0042112 A1 | 3/2003 | Woerner et al. | |

FOREIGN PATENT DOCUMENTS

| | | |
|---|---|---|
| DE | 3822756 A1 | 1/1990 |
| DE | 29917877 U1 | 4/2000 |
| EP | 0105555 A1 | 4/1984 |
| EP | 1000700 A1 | 5/2000 |
| EP | 1947036 A1 | 7/2008 |
| FR | 2922798 A1 | 5/2009 |
| GB | 2143807 A | 2/1985 |
| JP | H07300237 A | 11/1995 |
| JP | H1159870 A | 3/1999 |
| WO | 8807015 A1 | 9/1988 |

OTHER PUBLICATIONS

International Search Report and Written Opinion of the International Searching Authority Application No. PCT/EP2013/050343 Completed: Apr. 5, 2013; Mailing Date: Apr. 19, 2013 7 pages.

* cited by examiner

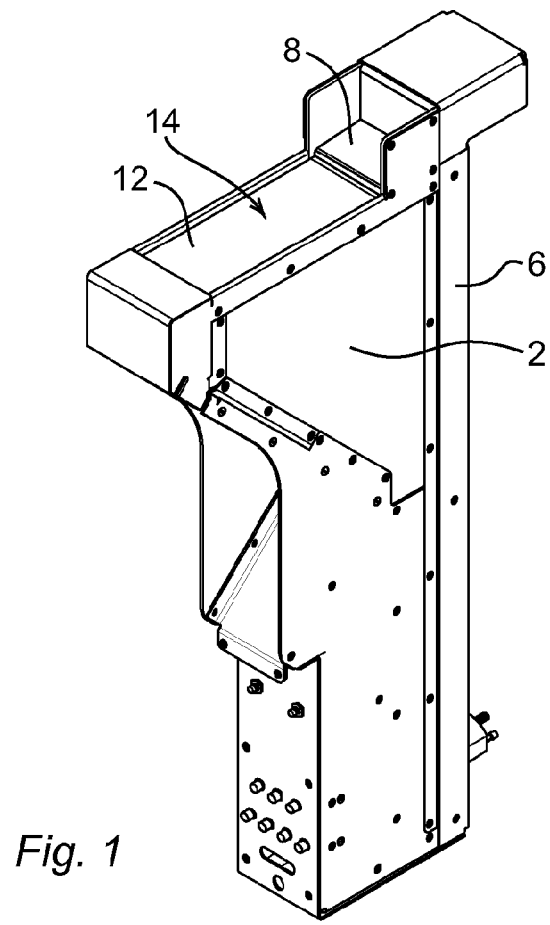
Fig. 1
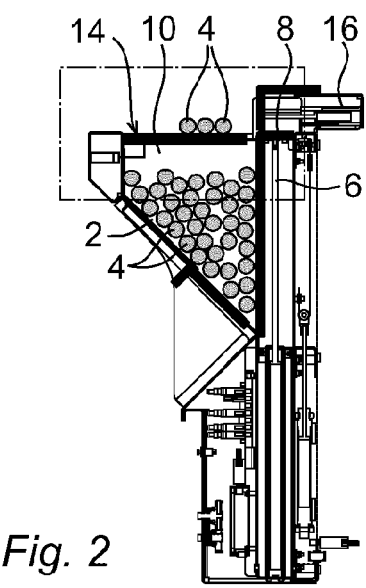
Fig. 2
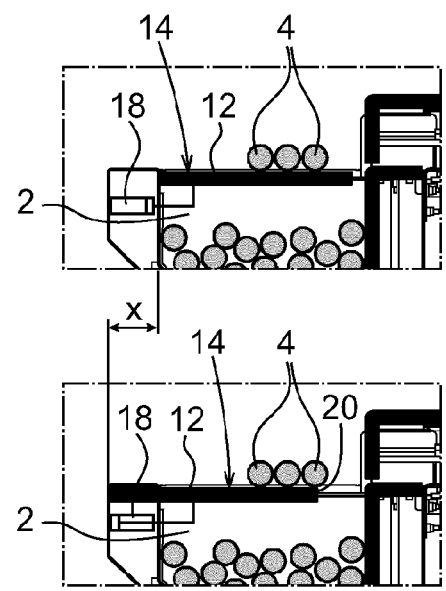
Fig. 3a
Fig. 3b

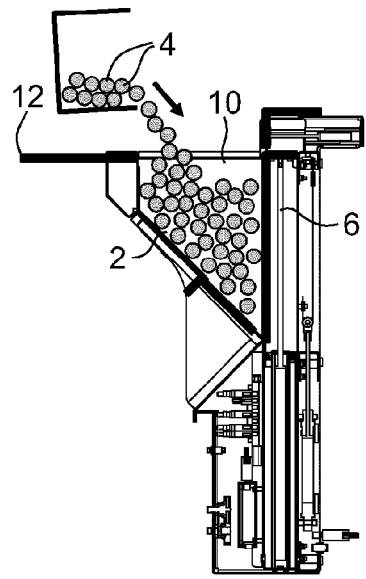 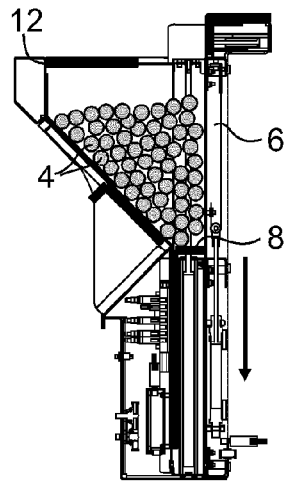 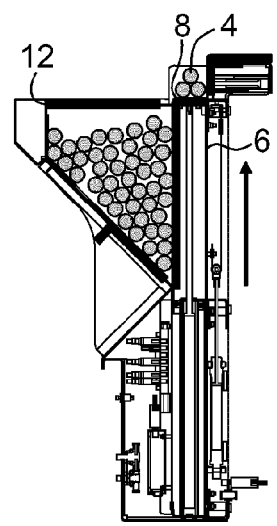
Fig. 4a Fig. 4b Fig. 4c
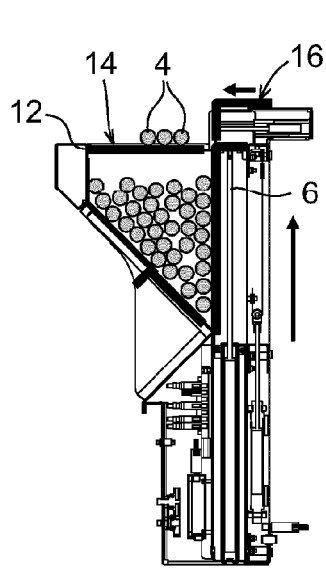 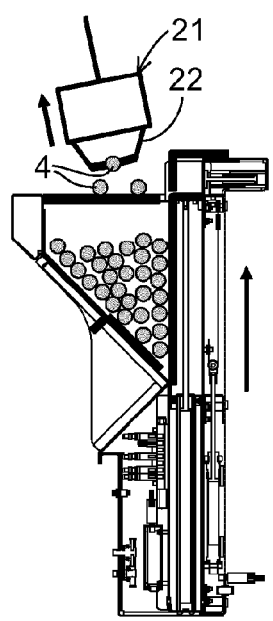 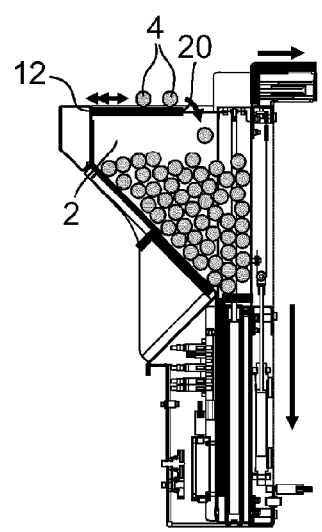
Fig. 4d Fig. 4e Fig. 4f

COMPONENT FEEDER SYSTEM AND METHOD FOR FEEDING AND DISPLAYING COMPONENTS

FIELD OF THE INVENTION

The present invention relates to a component feeder comprising a bulk storage container for components and a lift for elevating a selection of components from the container and onto a pick surface where the components may be picked by, for example, a robot.

The present invention also relates to a component feeder system comprising a component feeder, and further to a method for feeding and displaying components.

BACKGROUND OF THE INVENTION

In automated industrial systems, such as production lines where for example industrial robots are used, components stored in a disordered bulk storage are required to be fed as individual components, correctly oriented, in order for various operations to be performed. There exist many feeding devices using different principles and which are suitable for different specific tasks. A long known component feeder is the type using a vibratory bowl. When leaving this type of feeder, e.g. by being deposited on a conveyor belt, the component should be correctly oriented for its purpose, such as properly oriented to be picked by a robot tool. Typical for this type of feeder and many others is that they are not versatile and that in many cases they need to be customized for a specific component.

Another type of feeder is the type in which randomly oriented components are fed onto and displayed on a display surface. An image processing system is typically used in order to determine which components on the display surface are correctly oriented in order to be pickable by for example a robot tool. These types of feeders are more flexible since they are not limited to a certain type of component, at least not to the same extent as vibratory bowl feeders. In U.S. Pat. No. 7,028,829 is disclosed such a flexible parts feeder. Components are stored in a bulk storage and are fed onto an oscillating conveyor surface where they are randomly distributed. This arrangement is rather space demanding in relation to the actual pick surface, since the container is located beside the feeder. The entire transport system is also of a complex design involving both forward transport and reverse transport and separate oscillating means.

Another type of flexible parts feeder which is less space demanding is the type having a bulk storage container, inside which a lift is arranged. The lift has a lift platform that lifts components up from the container. A vision system is arranged over the lift platform and an image is used to determine which components are correctly oriented to be pickable by a robot tool. Thus the lift platform constitutes the display surface, which consequently is very small, and another disadvantage is that it also may be overcrowded with components making it difficult to determine pickable components.

SUMMARY OF THE INVENTION

An object of the present invention is to provide an improved flexible feeder that remedies the above mentioned disadvantages. Another object is to provide an improved component feeder system and an improved method for feeding and displaying components.

These objects are achieved by the component feeder according to the present teachings.

Accordingly is defined, in a first aspect of the present invention, a component feeder comprising a bulk storage container for storage of components, and a lift for elevating a selection of components from the container, said lift being located inside the container, characterised in that it further comprises a transfer arrangement for transferring elevated components from the lift onto a component pick surface on which the components are distributed in order to be picked by a tool or by a hand, and in that it comprises a plate configured to comprise said component pick surface. Through this is achieved the advantage that a larger component pick surface may be provided, since it is not limited to the small area of the platform of the lift. Further, by using a plate for the component pick surface, which plate as such is essentially rigid, a more simplified solution is offered as compared to conveyor belts. The plate is a rigid plate in the meaning that it is capable of being moved back and forth as one unit, by means of a pneumatic cylinder or a similar actuator device, without being deformed. The plate may be rigid in itself or at least comprise a rigid frame. The plate is furthermore a rigid plate in the meaning that it is not flexible enough to be foldable, or coiled around a capstan. It may for example be made of a hard plastic material, or at least have a frame made of a hard plastic material or similar. The plate may be solid, or at least have a solid frame.

According to one feature, the plate may at least partly cover an opening of the container and the plate is at least partly retractable from said opening. By placing the plate over an opening at the top of the container a very compact solution is offered for the feeder, since the component pick surface may be located on top of the container, and does not require any extra space of its own. The only space required for the feeder is actually the space required for the container.

According to another feature, the feeder comprises an actuator device configured to impart to the plate, with the component pick surface, a back and forth movement in the plane of the plate in a first mode, thereby transporting components along the plate towards a leading edge of the plate. According to a further feature, the plate is arranged to be at least partly retracted from the opening of the container during at least part of said back and forth movement and said leading edge of the plate faces said opening, whereby components transported to the leading edge of the plate will fall from the plate and back into the container. Through these features is obtained the advantage that the there is no need for a device that effects rearward transport of the components in order to return unpicked components to the container, only a forward transport is sufficient. The back and forth movement in the first mode preferably involves a slow movement in the forward direction, towards the lift, and a faster movement in the backward direction, thus obtaining a kind of jerking motion of the plate.

Additionally, the actuator device may be configured to impart to the plate, with the component pick surface, a back and forth movement in the plane of the plate in a second mode, by means of which the components lying on the component pick surface are re-oriented. The back and forth movements in the second mode are preferably performed with the same speed in both directions, giving the plate a kind of shaking motion.

The actuator device may comprise a pneumatic cylinder.

According to yet another feature, the plate may comprise a backlight arrangement. By using a plate for the component pick surface, instead of for example a conveyor belt or the lift platform, it is possible to install a backlight arrangement in connection with the plate. A backlight has the advantage of making the contours of the components lying on the pick surface easier to identify than a light from overhead, which is otherwise used.

According to one embodiment, the backlight arrangement may be characterised in that it comprises a transparent plate forming at least part of the plate with the component pick surface, and that it further comprises a light guide panel arranged underneath the transparent plate, and that it comprises at least one light source mounted at an edge of the light guide panel and emitting light into the light guide panel, which is configured to emit light in a perpendicular direction when hit by the light from said edge mounted at least one light source. An advantage of this arrangement is that it may be made very thin.

According to another embodiment, the backlight arrangement may comprise a transparent plate forming at least a part of the plate with the component pick surface and further comprise light sources arranged in a pattern underneath the transparent plate and configured to spread light through the transparent plate.

According to yet another embodiment, the backlight arrangement may comprise a panel of Organic Light Emitting Diodes, forming a least a part of the plate with the component pick surface.

According to a further feature, the plate may form a lid over said opening of the container and is at least partly retractable from said opening of the container in order to allow filling the container with components.

According to another aspect of the present invention is defined a component feeder system, comprising at least one component feeder, and further comprising a vision system with at least one camera for monitoring the component pick surface, and a processor for processing information received from the camera and for determining which components on the pick surface that are correctly oriented to be pickable and further to control an industrial robot to pick pickable components from the component pick surface.

According to yet another aspect of the present invention is defined a method for feeding and displaying components, comprising the following steps:
1) lifting a selection of components from a bulk storage container and transferring them onto a component pick surface comprising a plate,
2) imparting a first back and forth movement to the plate with the component pick surface, in the plane of the plate, thereby re-orienting components lying on the component pick surface,
3) imparting a second back and forth movement to the plate, in the plane of the plate, and thereby transporting components towards a leading edge of the plate,
4) retracting the plate from an opening into the container during said second back and forth movement, whereby the components transported to the leading edge will fall from the leading edge of the plate with the component pick surface and back into the container.

The advantages of this method correspond to the advantages already described above.

The method may comprise an additional step of lowering the lift down into the container, before step 3, and thereby provide an opening into the container by means of which components may fall back into the container.

The method may also comprise the additional step of backlighting at least a part of the plate with the component pick surface.

Further features and advantages of the present invention will become apparent from the following detailed description of the invention.

BRIEF DESCRIPTION OF THE DRAWINGS

The invention will now be described in more detail, with reference being made to the enclosed schematic drawings illustrating different aspects and embodiments of the invention, given as examples only, and in which:

FIG. 1 shows a schematic perspective view of an embodiment of a component feeder according to the present invention;

FIG. 2 shows a cross section of the component feeder in FIG. 1;

FIGS. 3a and 3b show details of the component feeder in an enlargement of the framed parts in FIG. 2, and in cross section;

FIGS. 4a-4f illustrate an embodiment of the component feeder in cross section and illustrating different steps in the operation of the feeder;

In the drawings, the same elements or corresponding elements in the different embodiments have been given the same reference number.

DETAILED DESCRIPTION OF THE INVENTION

Figure 5:
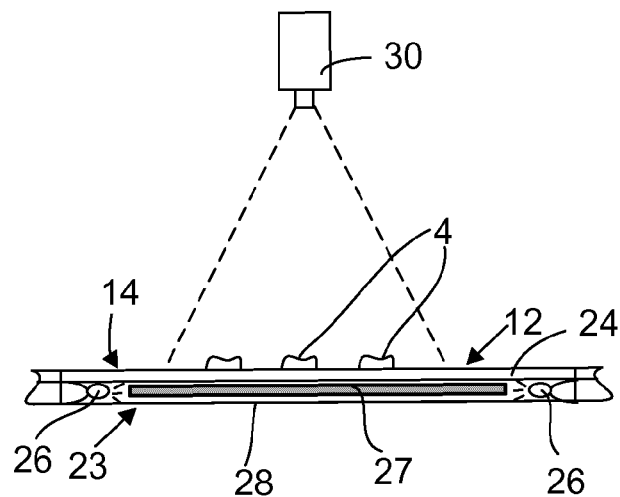
FIG. 5 shows an embodiment of a backlight arrangement.

In FIG. 1 and FIG. 2 is illustrated an embodiment of a component feeder according to the invention, in a schematic perspective view. The component feeder comprises a container 2 for bulk storage of components 4, preferably fairly small components that are suitable to be picked by a robot tool. The feeder may for example be placed in a production line where robots are used to pick up components that are to be assembled with other components or mounted on apparatuses. In the container 2 is arranged a lift 6 by means of which components placed inside the container may be vertically elevated up from the container. The lift 6 has a lift platform 8, which is essentially horizontal. When the lift platform is at its bottom level, at the bottom of the container, components 4 fall onto the platform 8 and will then be transported by the lift up to an upper level of the lift. The container 2 has an upper opening 10 which is at least partly covered by a plate 12. The plate 12 is rigid and is capable of being moved, e.g. back and forth, in some type of guide arrangement of a conventional design, not shown in detail. The upper surface of the plate is configured to form a component pick surface 14. When the lift 6 is at its upper level, the lift platform 8 will be adjacent to the plate 12 and approximately level with the component pick surface 14. The feeder will further comprise some type of transfer arrangement 16 for transferring components from the lift platform 8 to the plate 12. This transfer arrangement may for example be some kind of pusher device, as in the illustrated examples, but it may also be of other designs, such as a device for vibrating the platform, a device for tilting the platform, or a blower device, operative to make components on the platform fall onto the plate 12 and the component pick surface 14.

The plate 12 is retractable from at least part of the container opening 10 as illustrated in FIGS. 3a and 3b. The plate is moveable by means of an actuator device 18 comprising a pneumatic cylinder, which can give the plate a back and forth movement in its longitudinal direction with a stroke length x, in the region of 20-50 mm, preferably of 30-45 mm, and more preferably of around 40 mm. The cylinder is configured to be able to give the plate a series of pulses resulting in a slow movement in the forward direction, towards the lift, and a faster movement in the backward direction, thus obtaining a kind of jerking motion of the plate. A repetition of this motion will result in that components 4 lying on the pick surface 14 will be transported in a direction towards the leading edge 20 of the plate, from where they will fall over the edge and back into the container 2. By leading edge is meant the edge of the plate at the free end thereof, facing the lift platform 8. If the lift platform 8 has been lowered to its bottom level there will be a big enough opening into the container for the components to fall over the edge 20 and down into the container even when the plate 12 is in its non-retracted position. Otherwise, they will fall over the edge 20 only when the plate is in its retracted position as in FIG. 3b.

According to one embodiment, the pneumatic cylinder 18 may also be capable of operating in another mode, in which is obtained a re-orientation of the components 4 on the component pick surface 14. According to this mode, the back and forth movements of the plate 12 are performed with the same speed and in groups of 2-3 strokes, giving the plate a kind of shaking motion. This will have the result that the components change orientation on the component pick surface and sometimes also tumble over on the surface. By changing orientation, the components that previously were not pickable by the robot tool may now be pickable.

The operation of an embodiment of a feeder according to the present invention is illustrated in FIGS. 4a-4f.

In FIG. 4a is illustrated how the container 2 is filled with components 4 by making the plate 12 more or less fully retractable from the container opening 10. The actuator arrangement with the piston 18 is first disengaged in order to allow the plate 12 to slide out and away from the opening. Alternatively, the plate, or a part of the plate such as its central portion, can be hinged upwards in order to allow for components to be poured into the container. The lift 6 is then moved downwards to its bottom level and back upwards, bringing with it a selection of components on the lift platform 8, as shown in FIGS. 4b and 4c. In FIG. 4d is illustrated how the components on the lift platform are transferred over to the plate 12 by means of the transfer arrangement 16 and distributed on the component pick surface 14. When the components are on the component pick surface they may be picked by for example a robot 21 provided with a picking tool 22. However, only components that are correctly oriented can be picked and in order to identify which components that are correctly oriented and possible to pick, a vision system comprising a camera (not shown) is usually provided which can monitor the components on the component pick surface. The robot will pick pickable components 4 based on information obtained from the vision system. In FIG. 4f is shown how non-picked components 4 remaining on the plate 12 may be returned back into the container. The plate 12 is imparted a back and forth movement, as explained in connection with FIGS. 3a and 3b, resulting in a jerking motion that will have the effect that the components will travel along the plate towards its leading edge 20, where they will fall over the edge and into the container below the plate. If the lift platform 8 has been lowered, the components 4 will fall through the opening left by the lift platform, and/or they will fall through the opening at the front end of the plate, facing the lift, which opening will occur when the plate 12 is at its rearmost end position, partly retracted from the opening of the container.

Between 4e and 4f a step with an optional function may be provided. After the robot 21 has picked its first round of pickable components, the plate may be subjected to a back and forth movement in a different second mode resulting in a shaking motion that will re-orient the components. This has also been explained above. This shaking motion may be repeated any number of times, before the final step leading to return of unpicked components into the container.

The plate 12 is a rigid plate in the meaning that it is capable of being moved back and forth by means of a pneumatic cylinder or a similar actuator device without being deformed. The plate is furthermore a rigid plate in the meaning that is not flexible enough to be coiled around a capstan. It may for example be made of a hard plastic material. The plate may be solid, or at least made of a solid frame. The component pick surface 14 on the plate 12 may then be constituted by the top surface itself of the plate, possibly with a suitable coating in order to facilitate transportation and/or re-orientation of the components. Alternatively, the component pick surface may be of a different material that is applied on top of the plate 14, thereby forming the component pick surface.

The plate 12, with the component pick surface 14, can optionally be equipped with a backlight arrangement 23. In FIG. 5 is illustrated an embodiment of such a plate. At least a part of the plate 12 is made up of a transparent plate 24, e.g. a plastic plate. Underneath the transparent plate 24 is arranged a light guide panel 27, comprising a transparent plate, preferably of a plastic material, e.g. plexiglass, and light sources 26, e.g. LED lights, that are arranged at the edges of the panel 27 to shine a light into the panel, under the transparent plate. Underneath the light guide panel there is preferably also a bottom plate 28 such that an enclosed unit is obtained. The light guide panel 27 has a light deflecting design such that when the light strikes the panel, the light escapes from the panel and is emitted perpendicular to the panel and up through the transparent plate 24. This may be achieved by the light guide panel 27 being designed with a pattern of surface irregularities on its downward side, or it may have another design with corresponding effect. Similar technology is used in backlighting units for machine vision. A typical thickness of such a light guide panel is around 10 mm. The outward facing surface of the transparent plate 24 will form the component pick surface 14. In order to protect the outward facing surface of the transparent plate 24, e.g. from wear caused by the components or dirt, it may be provided with a thin protective sheet of a suitable transparent material.

Figure 6:
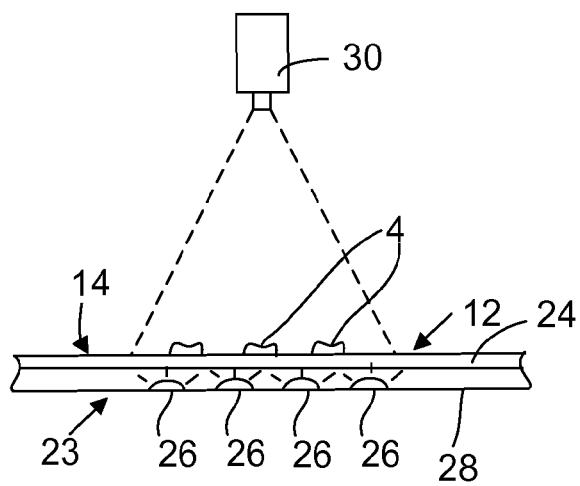
FIG. 6 shows an alternative embodiment of a backlight arrangement.

In FIG. 6 is illustrated an alternative embodiment of a backlight arrangement. At least a part of the plate 12, with the component pick surface 14, is formed of a transparent plate 24, similar to FIG. 5. Underneath the plate 24 is arranged a pattern, e.g. a pattern forming regular squares, of light sources 26, e.g. LED lights. The transparent plate 24 is preferably designed to have a light spreading function, and the light from the light sources 26 will then shine through and spread through the transparent plate 24 such that objects lying on the surface of the transparent plate will be lit by a backlight. There is preferably also a bottom plate 28 such that it constitutes an enclosed unit, and onto which the light sources 26 may be mounted. The outward facing surface of the transparent plate 24 will then form the component pick surface 14. Also in this embodiment, the outward facing surface of the transparent plate may be provided with a thin protective sheet of a suitable transparent material in order to protect it from e.g. wear caused by the components or dirt.

Figure 7:
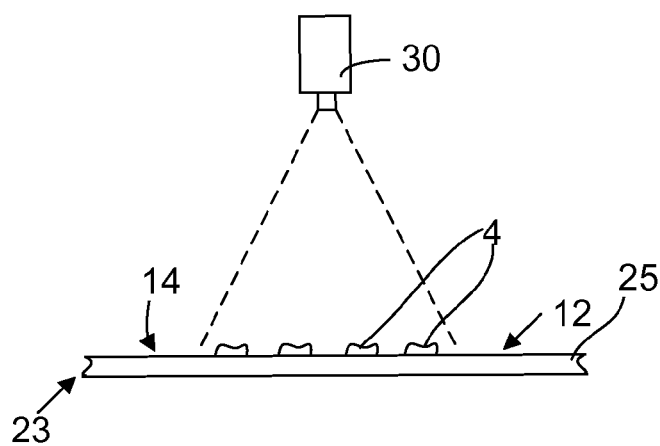
FIG. 7 shows a further alternative embodiment of a backlight arrangement.

Other alternatives for backlight arrangements are panels of Organic Light Emitting Diodes, so called OLED panels. These are thin light emitting panels made from organic material (carbon based), which emit light when electricity is applied. In FIG. 7 is illustrated a backlight arrangement including an OLED panel (25).

As shown in FIGS. 5, 6 and 7, there is a vision system comprising a camera 30 arranged over the backlit component pick surface 14. Components 4 lying on the component pick surface 14 will be more easily identified since their contours will be more distinct against the lit background, and consequently it will be easier to determine which components are oriented such that they are pickable by a robot tool.

In the visions system, the camera 30 is arranged to send an image of the components lying on the component pick surface to an image processing unit, where image processing software will recognize the contours of any components that are present in the predetermined orientation suitable for picking by a robot tool and identify these pickable components. The information about pickable components is then further processed and a control unit will send control signals to the robot tool indicating where there are components properly oriented to pick, e.g. by giving coordinates.

It should be mentioned that the vision system may of course also be used even if there is no backlight arrangement.

The present invention is not limited to the disclosed examples, but may be modified in many ways that would be apparent to the skilled person, within the scope of the appended claims.

What is claimed is:

1. A component feeder comprising a bulk storage container for storage of components, and a lift for elevating a selection of components from the container, said lift being located inside the container, wherein the component feeder further comprises a transfer arrangement for transferring elevated components from the lift onto a component pick surface on which the components are distributed in order to be picked by a tool or by a hand, and a plate comprising said component pick surface, which plate at least partly covers an opening of the container, and wherein the plate is at least partly retractable from said opening.

2. The component feeder according to claim 1, characterised in that it comprises an actuator device configured to impart to the plate a back and forth movement in the plane of the plate in a first mode, thereby transporting components along the plate towards a leading edge of the plate.

3. The component feeder according to claim 2, characterised in that the plate is arranged to be at least partly retracted from the opening during at least part of said back and forth movement and that said leading edge of the plate faces said opening, whereby components transported to the leading edge of the plate will fall from the plate and back into the container.

4. The component feeder according to claim 2, characterised in that the actuator device is configured to impart to the plate, with the component pick surface, a back and forth movement in the plane of the plate in a second mode, by means of which the components lying on the component pick surface are re-oriented.

5. The component feeder according to claim 2, characterised in that said actuator device comprises a pneumatic cylinder.

6. The component feeder according to claim 1, characterised in that the plate comprises a backlight arrangement.

7. The component feeder according to claim 6, characterised in that the backlight arrangement comprises a transparent plate forming at least part of the plate with the component pick surface, that it further comprises a light guide panel arranged underneath the transparent plate and that it comprises at least one light source mounted at an edge of the light guide panel and emitting light into the light guide panel, which is configured to emit light in a perpendicular direction when hit by the light from said edge mounted at least one light source.

8. The component feeder according to claim 6, characterised in that the backlight arrangement comprises a transparent plate forming at least a part of the plate with the component pick surface, that it further comprises light sources arranged in a pattern underneath the transparent plate and configured to spread light through the transparent plate.

9. The component feeder according to claim 6, characterised in that the backlight arrangement comprises a panel of Organic Light Emitting Diodes, forming a least a part of the plate with the component pick surface.

10. The component feeder according to claim 1, characterised in that the plate with the component pick surface forms a lid over said opening of the container and that it is at least partly retractable from said opening of the container in order to allow filling the container with components.

11. A component feeder system, comprising at least one component feeder according to claim 1, and further comprising a vision system with at least one camera for monitoring the component pick surface, and a processor for processing information received from the camera and for determining which components on the pick surface that are correctly oriented to be pickable and further to control an industrial robot to pick pickable components from the component pick surface.

12. A method for feeding and displaying components, comprising the following steps:
  1) lifting a selection of components from a bulk storage container and transferring them onto a component pick surface comprising a plate,
  2) imparting a first back and forth movement to the plate with the component pick surface, in the plane of the plate, thereby re-orienting components lying on the component pick surface,
  3) imparting a second back and forth movement to the plate, in the plane of the plate, and thereby transporting components towards a leading edge of the plate,
  4) retracting the plate from an opening into the container during said second back and forth movement, whereby the components transported to the leading edge will fall from the leading edge of the plate with the component pick surface and back into the container.

13. The method according to claim 12, comprising an additional step of lowering the lift down into the container before step 3, and thereby provide an opening into the container by means of which components may fall back into the container.

14. The method according to claim 12, comprising the additional step of backlighting at least part of the plate with the component pick surface.

* * * * *